(12) United States Patent
Yen

(10) Patent No.: US 12,363,173 B2
(45) Date of Patent: Jul. 15, 2025

(54) ROUTER MONITORING DATA DEVICE OF ROADWAY EQUIPMENT

(71) Applicant: HUNG MING INFORMATION CO., LTD., Taichung (TW)

(72) Inventor: Chia Chun Yen, Taichung (TW)

(73) Assignee: Hung Ming Information Co., Ltd., Taichung (TW)

( * ) Notice: Subject to any disclaimer, the term of this patent is extended or adjusted under 35 U.S.C. 154(b) by 121 days.

(21) Appl. No.: 18/475,402

(22) Filed: Sep. 27, 2023

(65) Prior Publication Data
US 2024/0348656 A1    Oct. 17, 2024

(30) Foreign Application Priority Data

Apr. 14, 2023   (TW) .................................. 112114111

(51) Int. Cl.
*H04L 9/40*      (2022.01)
*H04L 43/04*     (2022.01)
*H04L 43/10*     (2022.01)

(52) U.S. Cl.
CPC ............. *H04L 63/20* (2013.01); *H04L 43/04* (2013.01); *H04L 43/10* (2013.01); *H04L 63/0236* (2013.01); *H04L 63/1425* (2013.01)

(58) Field of Classification Search
None
See application file for complete search history.

(56) References Cited

U.S. PATENT DOCUMENTS

2022/0366738 A1*  11/2022  Pabla ................. G06N 5/02

* cited by examiner

*Primary Examiner* — Quang N Nguyen
(74) *Attorney, Agent, or Firm* — Rosenberg, Klein & Lee

(57) ABSTRACT

The present invention relates to a router monitoring data device of roadway equipment that mainly provides all roadway equipment with functions to receive and record the return traffic data transmitted from a plurality of roadway equipment, such as vehicle detector, changeable message sign, automatic vehicle identification, traffic signal controller, electronic tag and other devices within a specific area through such a router monitoring data device that uploads the return traffic data to a management platform center side for analyzing the state of the roadway equipment. The present invention provides effective security monitoring on the roadway equipment, prevents attack from hackers, and averts the content of return traffic data transmitted by the roadway equipment from being tampered.

13 Claims, 10 Drawing Sheets

State of Roadway Equipment 9 – abnormal communication

| Line Disconnection of Equipment Side | Line Disconnection of Routers |

| Abnormal IP Address Addition | Abnormal MAC Address Addition | Abnormal Communication Port Addition |

FIG.9

ROUTER MONITORING DATA DEVICE OF ROADWAY EQUIPMENT

1. FIELDS OF THE INVENTION

The present invention relates to the domain of roadway equipment data collection, especially the technical scope of a router monitoring data device of roadway equipment.

2. DESCRIPTIONS OF RELATED ART

Generally, roadways are equipped with a few devices and equipment, including vehicle detector (VD), changeable message sign (CMS), automatic vehicle identification (AVI), traffic signal controller (TC), detector of the electronic tag (eTag) of an electronic toll collection system, wherein the VD collects data of traffic flows; the CMS posts messages through the communication transport network in order to provide road condition information, traffic propaganda or relevant messages to road users; the AVI identifies and records the time and license plate of each vehicle that passes by the detection point; the TC equipment controls the operation of red, yellow, green traffic lights at the intersection; the eTag detector is used to read data from electronic tags in the passing cars.

As shown in FIG. 10, a roadway equipment 9 currently can control or return data of the traffic and road conditions back to the traffic control center side 7 through a communication network equipment (for example, modem 8) controlled by the traffic control center side 7, which is constructed by the government public sector. The transmission pathway is to first deliver the return traffic data, collected by the roadway equipment 9, to the virtual private network of government service networks (GSN VPN) constructed by internet service providers (ISP) and then finally to the traffic control center side 7, through wired network or wireless network methods and using ADSL or a 4G router modem device 8.

However, the roadway equipment 9 are lack of information security management and can easily become a hacking target. Unused network ports can be a channel easily attacked by hackers. For example, after being infected with virus, a system of traffic control center side 7 stops functioning partially or entirely, or text contents of CMS equipment are altered. Therefore, the existing transmission methods of the roadway equipment 9 for returning traffic data to the traffic control center side need to be improved.

SUMMARY OF THE INVENTION

In view of the aforementioned problems of the existing roadway equipment in return traffic data transmission and maintenance, authors of the present invention invent a router monitoring data device of roadway equipment. The main objective of the present invention is to provide a router monitoring data device of roadway equipment that can monitor the communication state of roadway equipment. The secondary objective of the router monitoring data device of roadway equipment of the present invention is to provide a higher level of security monitoring in roadway equipment and to effectively prevent attack from hackers.

judgment module, wherein the communication module transmits and receives data packets of roadway equipment out in the fields; the receiver module is electrically connected with the communication module and performs functions of receiving packets of push commands of a management platform center side; the whitelist database is electrically connected with the judgment module and has the function of storing a safety checklist of electronic device identification and network address; the judgment module is electrically connected with the receiver module and provides functions of analyzing packets of the return traffic data transmitted by the roadway equipment and judging command packets; the judgment module issues commands that determine whether the return information sent from the roadway equipment shall be recorded and whether such information conforms an abnormal communication of the equipment side, wherein the judgment module determines commands and conditions of abnormal communication of the equipment side that must be recorded; comparison is performed based on the safety checklist of electronic device identification and network address retrieved from the whitelist database; regardless whether a match is found or not, information of the operational actions of the roadway equipment is transmitted by the communication module to a communication receiving program of a designated communication port specified by the management platform center side;

wherein the communication module only captures and transmits fixed packet headers to the communication receiving program of the designated communication port specified by the management platform center side;

wherein the safety checklist of electronic device identification and network address is a list of communication ports of IP addresses and Mac addresses available for roadway equipment to plug in;

wherein the safety checklist of electronic device identification and network address is updated on a daily basis;

Wherein the communication module can determine whether return traffic data of the roadway equipment can be uploaded to the traffic control center side based on the safety checklist of the electronic device identification and network address in order to ensure security and accuracy of the return traffic data;

wherein an abnormal communication condition of the equipment side refers to line disconnection of equipment side, line disconnection of routers, abnormal IP address addition, abnormal MAC address addition or/and abnormal communication port addition;

wherein roadway equipment include vehicle detectors (VD), changeable message signs (CMS), automatic vehicle identification (AVI), and detectors of the electronic tag (eTag).

Therefore, the present invention adopts the aforementioned technical means to achieve the following effects:

1. The present invention can monitor the return traffic data transmitted from the equipment side in order to determine whether communication of the equipment side is abnormal or not through the use of the judgment module, in conjunction with the whitelist database, for example, by monitoring conditions of "line disconnection of equipment side", "line disconnection of routers", "abnormal IP address addition", "abnormal MAC address addition" or/and "abnormal communication port addition". When an abnormal condition is detected, the abnormal data then will be further analyzed by the management platform center side for subsequent processing.

2. The present invention simply delivers packet headers and data to the management platform center side and, therefore, will not overload the equipment side with excessive communication workload.

3. The router monitoring data device of roadway equipment of the present invention provides contents of the whitelist database that are updated daily so that the present invention can determine whether return traffic data of the equipment side can be uploaded to the traffic control center side based on the safety checklist of the electronic device identification and network address in order to ensure security and accuracy of the return traffic data.

The present invention will become more fully understood from the detailed description given herein below for illustration only which thus does not limit the present invention, wherein:

BRIEF DESCRIPTION OF THE DRAWINGS

FIG. 9 is a schematic diagram of a few forms of abnormal communication of the equipment side of the present invention.

DETAILED DESCRIPTION OF THE PREFERRED EMBODIMENT

Figure 1:
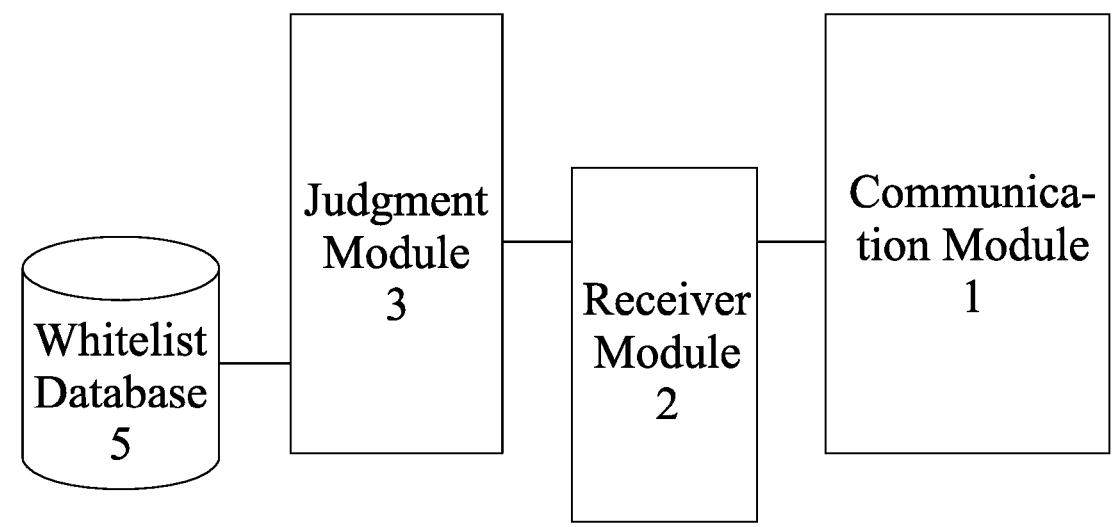
FIG. 1 is an architecture diagram of the router monitoring data device of the present invention.
Figure 2:
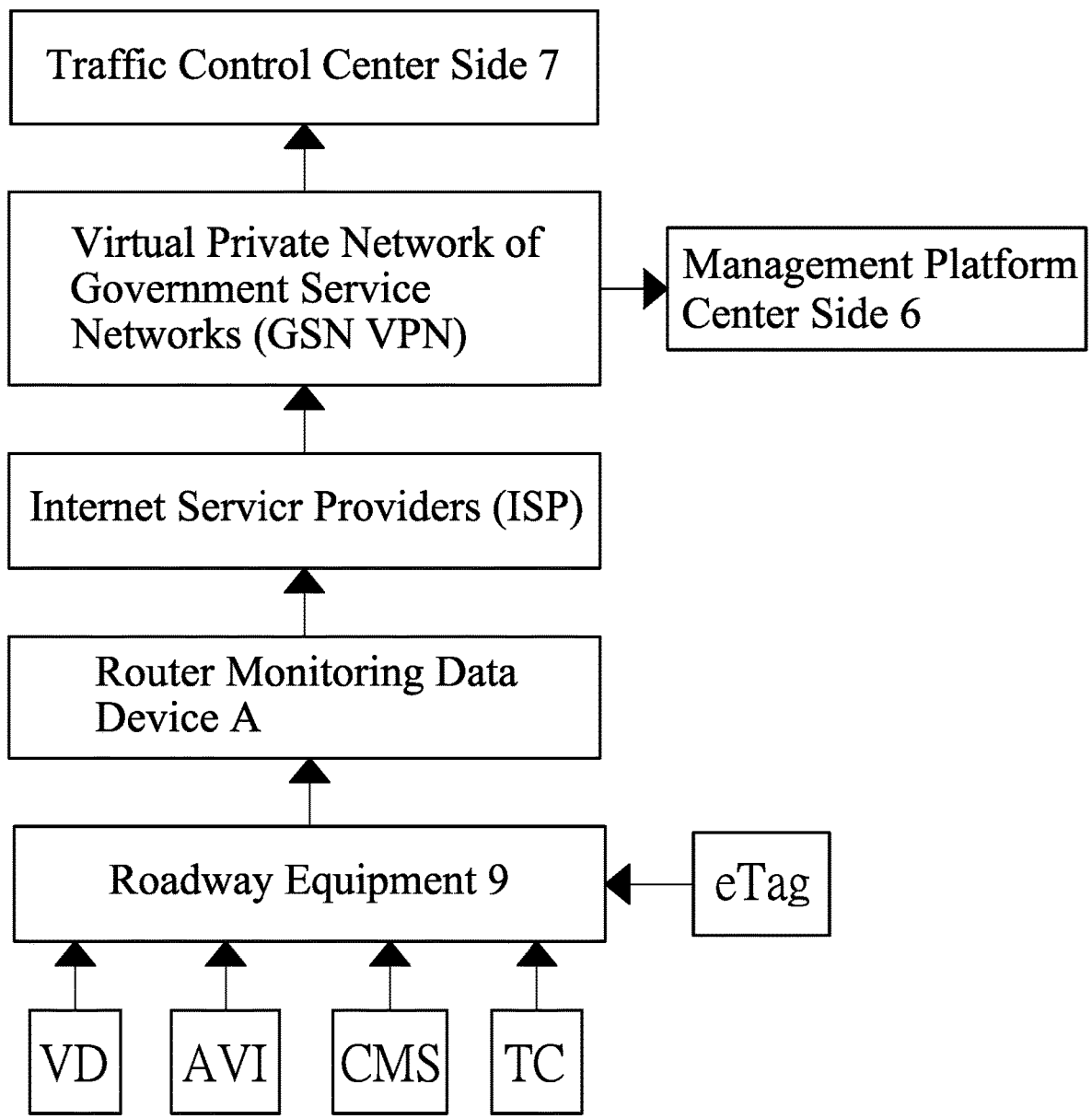
FIG. 2 is a schematic diagram of an embodiment of the router monitoring data device of the present invention.
Figure 3:
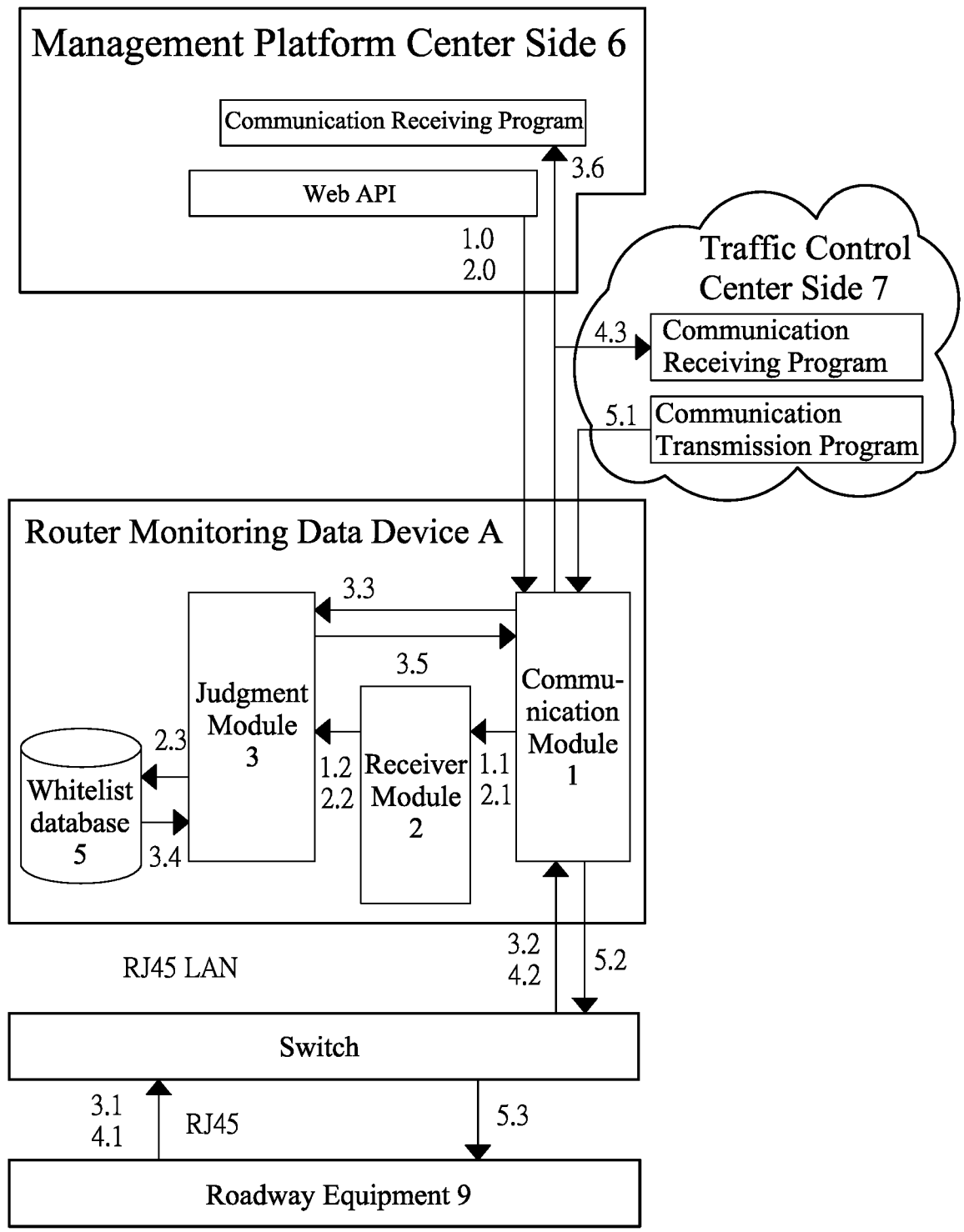
FIG. 3 is an overall action schematic diagram of the router monitoring data device of the present invention.

The present invention relates to a router monitoring data device, as shown in FIG. 1 to FIG. 4, that mainly provides all roadway equipment 9 with functions to receive, record, and monitor return traffic data, transmitted by a plurality of roadway equipment 9, such as vehicle detector (VD), changeable message sign (CMS), automatic vehicle identification (AVI), traffic signal controller (TC), electronic tag (eTag) and other devices within a specific area through such a router monitoring data device A, which replaces the existing modems and communication equipment. The router monitoring data device A of the present invention also can upload the return traffic data to a management platform center side 6 for analysis through the virtual private network of government service networks (GSN VPN) in order to provide effective security monitoring on the roadway equipment 9, prevent attack from hackers, and avert the contents of return traffic data transmitted by the roadway equipment 9 from being tampered. The router monitoring data device A comprises key components of a communication module 1, a receiver module 2, a judgment module 3 and a whitelist database 5. Descriptions of the aforementioned components are provided as follows.

The communication module 1 transmits the return traffic data and receives packets of commands, wherein when the roadway equipment 9 delivers the equipment information through wired network or wireless network methods, the communication module 1 will transmit such information to the judgment module 3.

The receiver module 2 is electrically connected with the communication module 1 and performs functions of receiving packets of Web API push commands of the management control center side 6.

The judgment module 3, which is electrically connected with the receiver module 2, provides functions of analyzing packets of the return traffic data transmitted by the roadway equipment 9 and determining command packets, wherein the judgment module 3 issues commands that determine whether the return information sent from the roadway equipment 9 shall be recorded and whether such information conforms an abnormal communication of the equipment side. If the condition is judged as an abnormal communication, the condition shall be checked by matching with a safety checklist of electronic device identification and network address (commonly known as the "whitelist" in the industry; hereinafter referred to as "the whitelist") retrieved from the whitelist database 5. Regardless whether a match is found or not, information of the operational actions of the roadway equipment 9 is transmitted by the communication module 1 to a communication receiving program of a designated communication port specified by the management platform center side 6; only fixed packet headers are transmitted to prevent the communication in the equipment side from overload. In general, the electronic devices listed in the safety checklist of electronic device identification and network address refer to single chips, IPC computers, tablet computers, notebook computers, and desktop computers.

The whitelist database 5, which is electrically connected with the judgment module 3, has the function of storing the whitelists, wherein the whitelist database 5 is updated on a daily basis; the whitelist can provide the communication ports of IP addresses and Mac addresses available to be used by roadway equipment 9 to transmit the return traffic data.

Figure 4:
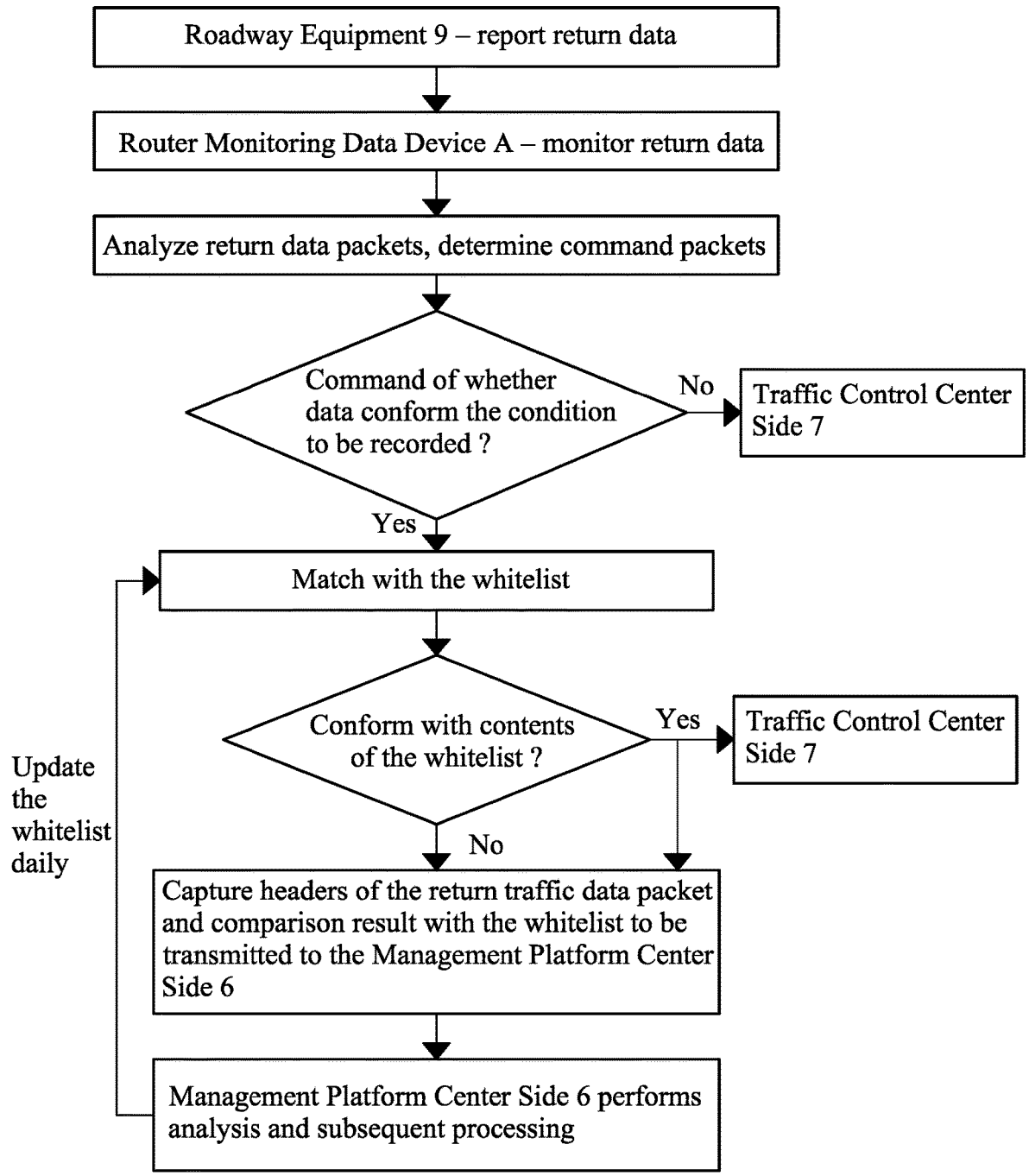
FIG. 4 is a flow chart of the overall operation of the router monitoring data device of the present invention monitoring return traffic data transmitted from the equipment side.

Therefore, the router monitoring data device A of the present invention mainly provides optimal solutions for roadway equipment 9, as shown in FIG. 4. When a roadway equipment 9 transmits return traffic data, the router monitoring data device A monitors such data, analyzes packets of the return traffic data and command packets transmitted by the roadway equipment 9. If the packet of the return traffic data needs to be recorded, the judgment module 3 will retrieve the whitelist from the whitelist database 5 to process matching. Regardless whether a match is found within the whitelist or not, the header of the return traffic data packet and the comparison result with the whitelist, together with information of the operational actions of the roadway equipment 9, will be captured and transmitted by the communication module 1 to a communication receiving program of a designated communication port specified by the management platform center side 6, so that the management platform center side 6 can perform analysis and subsequent processing. For instance, if no match in IP or MAC PORT of the whitelist is detected, there is a strong possibility that the system is under attack by hackers. On the other hand, if the packet of return traffic data does not need to be recorded and has a match in the whitelist, the return traffic data of the roadway equipment 9 will be transmitted directly to the traffic control center side 7 by the communication module 1.

Figure 5:
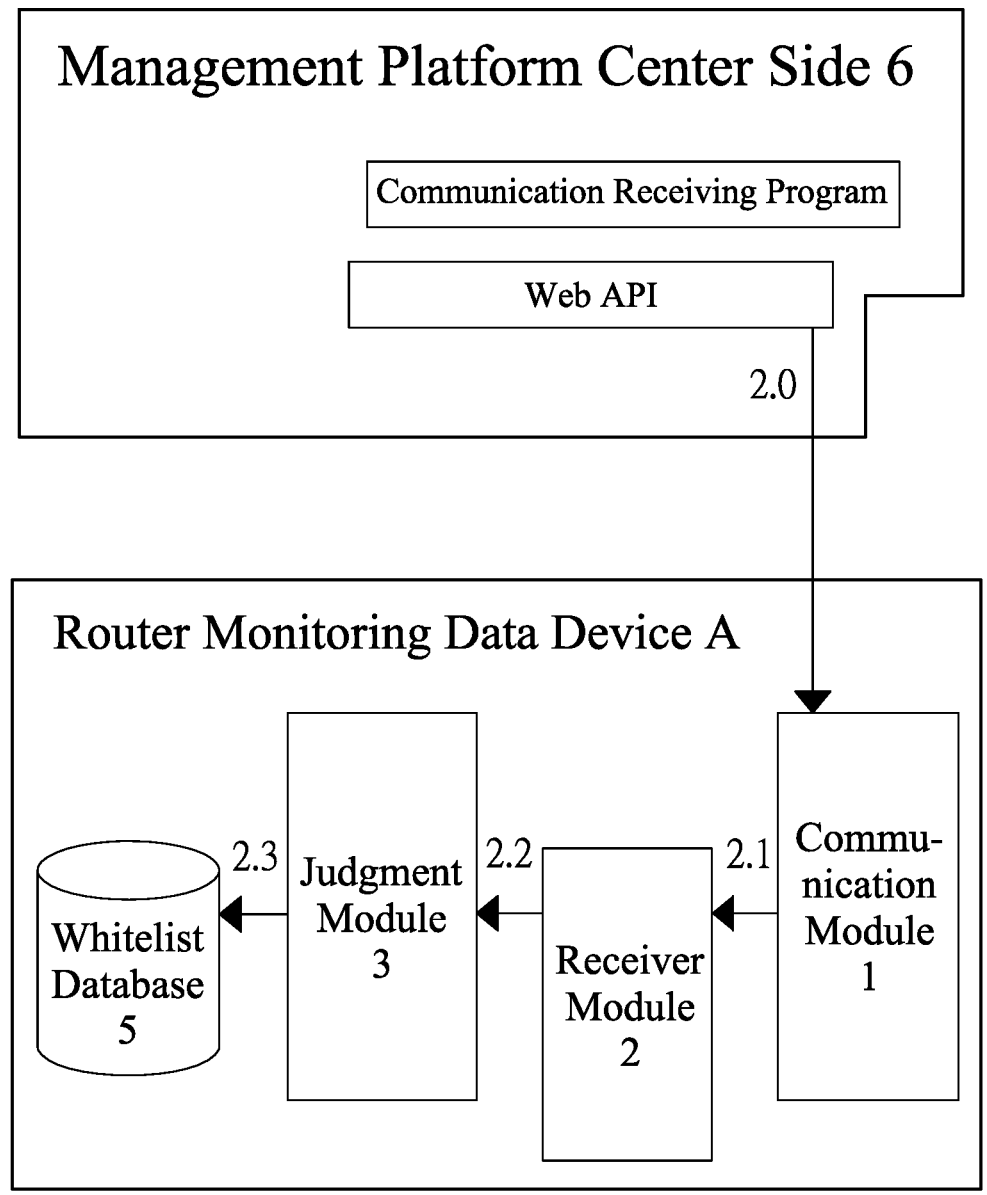
FIG. 5 is an action flow chart of the router monitoring data device of the present invention updating the whitelist on a daily basis.

When the router monitoring data device A is updating the whitelist, as shown in FIG. 5, the implementation pathway is from steps 2.0 to 2.3, wherein the pathway includes [2.0: daily update]→[2.1: accepting push command from Web API]→[2.2: analyzing packet; judging command] →[2.3: updating IP communication port and MAC address of the whitelist].

Figure 6:
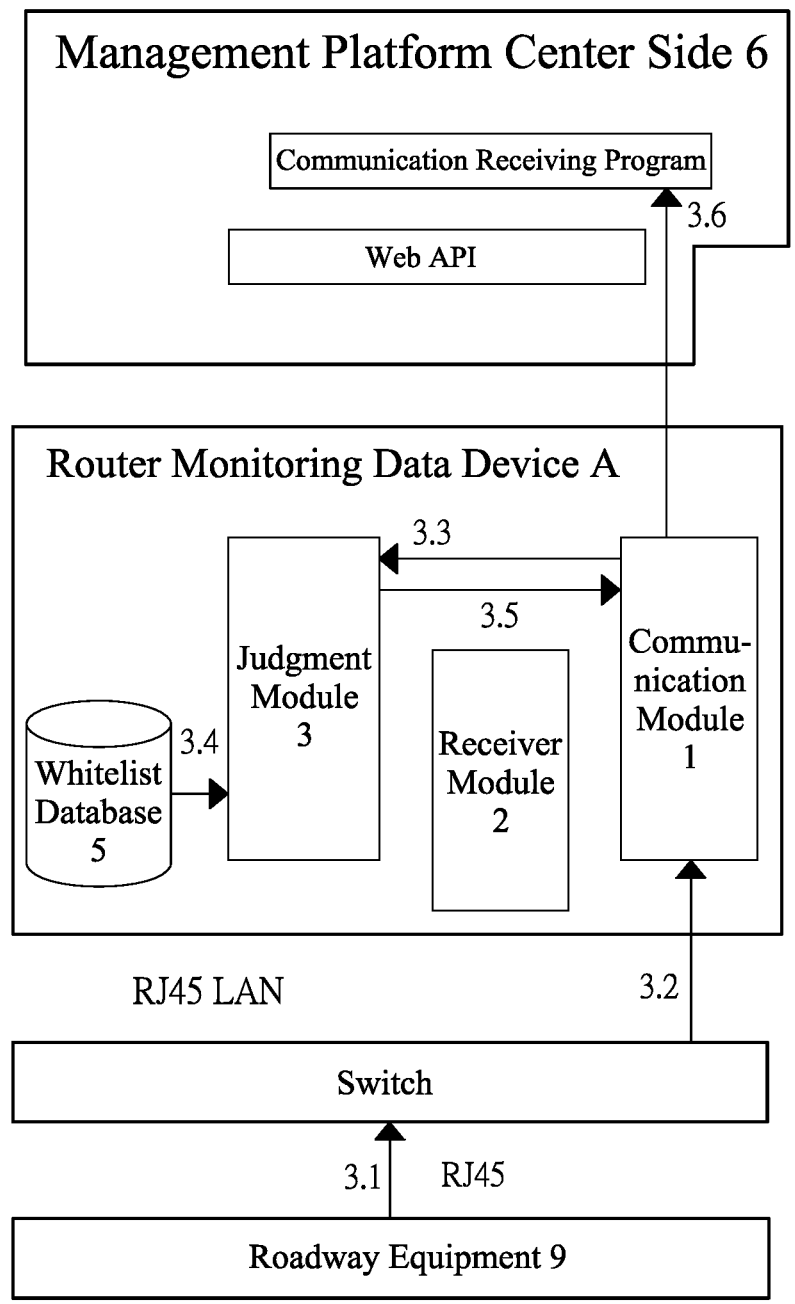
FIG. 6 is an action flow chart of the router monitoring data device of the present invention monitoring the return traffic data transmitted from the equipment side.

When the router monitoring data device A is transmitting return data of the equipment side and detecting whether abnormal communication conditions exist, as shown in FIG. 6, the implementation pathway is from steps 3.1 to 3.6, wherein the pathway includes [3.1: reporting from equipment on equipment information (VD: traffic volume, velocity, and density; CMS: changeable Message currently displayed . . . )]→[3.2: data flowing from switch to router]→[3.3: command of judging whether message shall be recorded, and whether message conforming conditions of abnormal communication, including line disconnection of equipment side, line disconnection of routers, abnormal IP address addition, abnormal MAC address addition, and abnormal communication port addition]→[3.4: Retrieving whitelist for matching]→[3.5: regardless whether a match is found in whitelist, transmitting operational actions of equipment through communication module 1]→[3.6: message received by communication receiving program 21 of designated communication port]. The router monitoring data device A will transmit a message of the abnormal condition to the management platform center side 6 in order to determine the state of the roadway equipment 9 and subsequent processing, such as blackout/reboot or maintenance dispatch.

Figure 7:
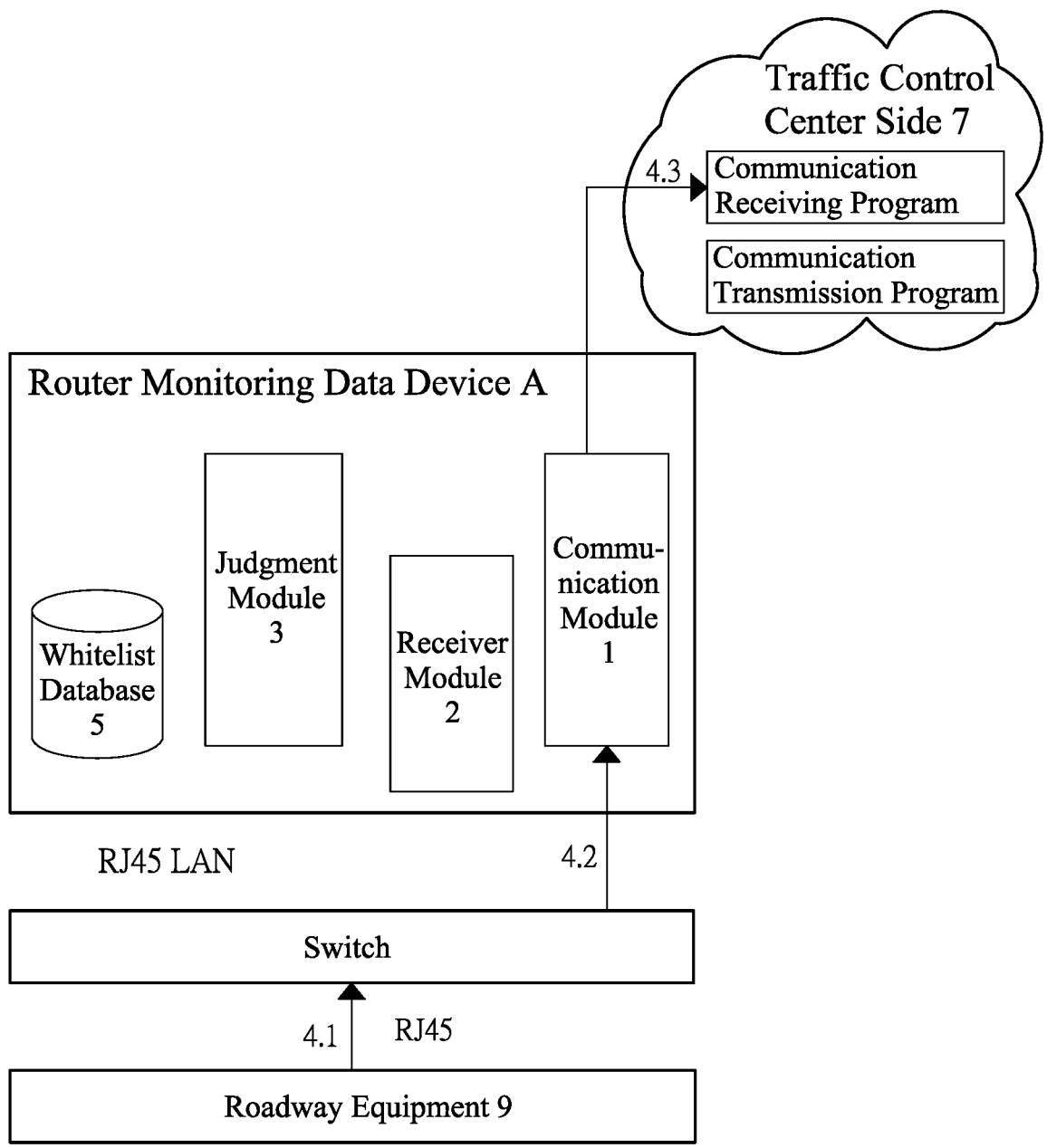
FIG. 7 is an action flow chart of the router monitoring data device of the present invention uploading the return traffic data transmitted from the equipment side.

When the router monitoring data device A is transmitting return data of the equipment side, as shown in FIG. 7, the implementation pathway is from steps 4.1 to 4.3, wherein the pathway includes [4.1: reporting from equipment on equipment information (VD: traffic volume, velocity, and density; CMS: changeable Message currently displayed . . . )] . . . )]→[4.2: data flowing from switch to router]→[4.3: data received by traffic control center side 7]. Normal and no abnormal return data are transmitted directly to the traffic control center side 7. For one other example, when the router monitoring data device A is detecting whether it is an abnormal communication, a PING command is usually issued to the roadway equipment 9 and the traffic control center side 7 in order to test whether line disconnection in communication exists. If an abnormal communication exists, then the router monitoring data device A will transmit this message to the management platform center side 6 for conducting subsequent maintenance.

Figure 8:
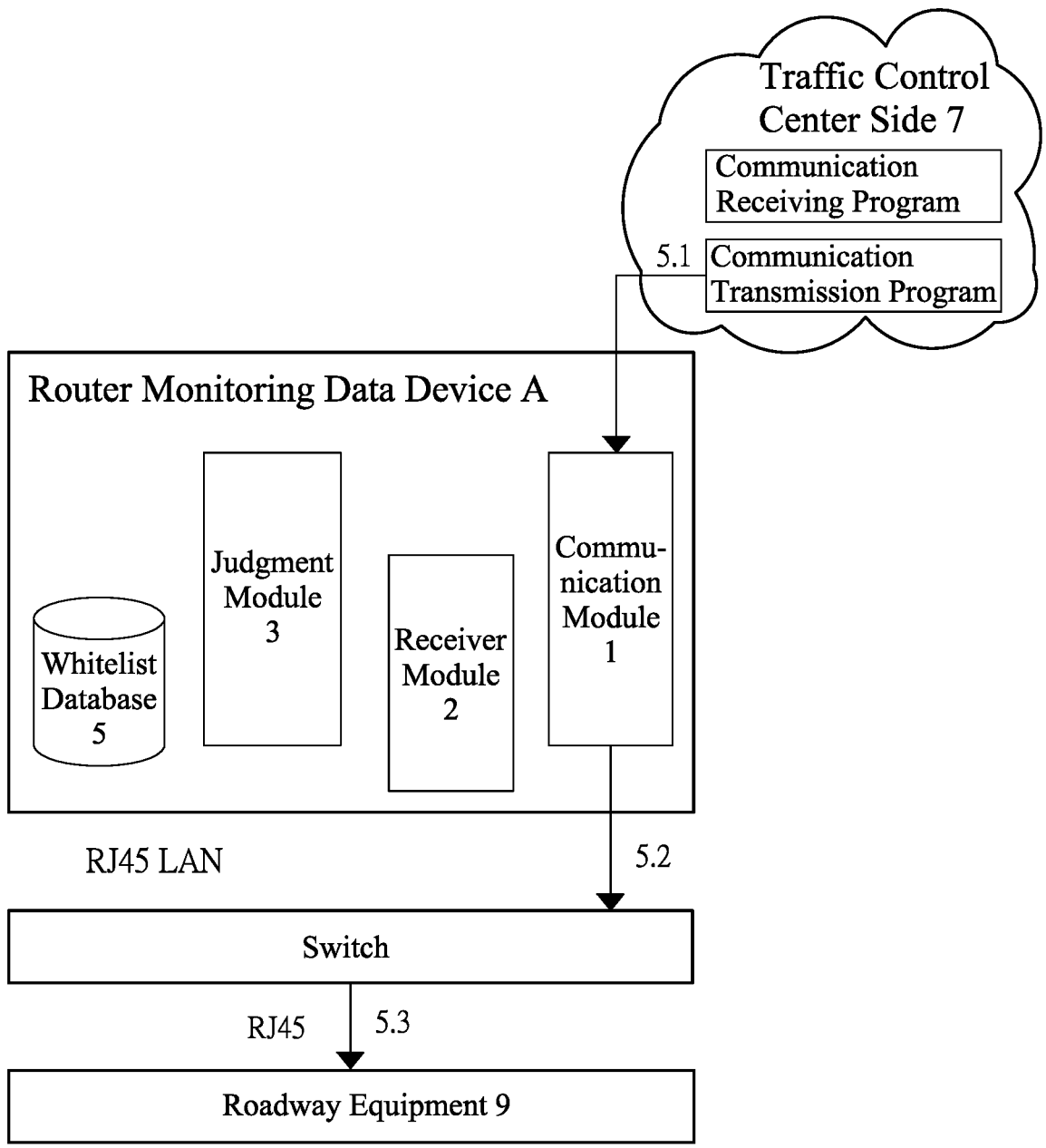
FIG. 8 is an action flow chart of the traffic control center side issuing commands to the equipment side through the router monitoring data device of the present invention.
Figure 10:
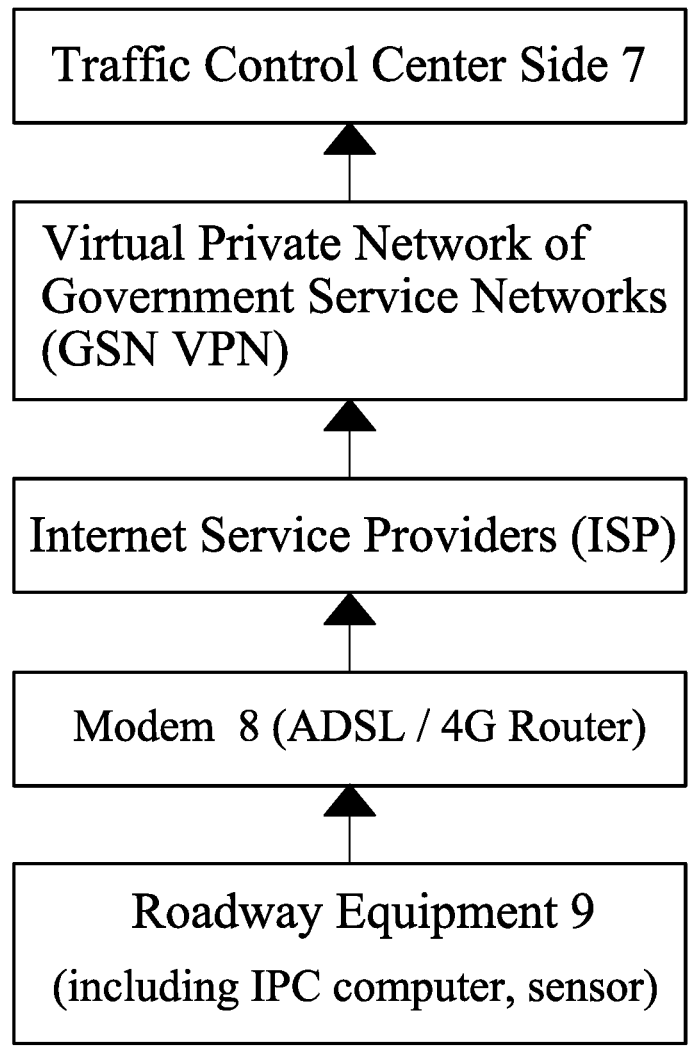
FIG. 10 is a schematic diagram of the internet-connected pathway for returning data of conventional roadway equipment.

When the router monitoring data device A is executing commands issued by the traffic control center side 7, as shown in FIG. 8, the implementation pathway is from steps 5.1 to 5.3, wherein the pathway includes [5.1: traffic control center side 7 issuing commands]→[5.2: transmitting data]→[5.3: transmitting data to roadway equipment 9]. In this implementation pathway, the traffic control center side 7 obtains the control right from the roadway equipment 9. Taking the traffic signal as an example, the SET command is to change the interval time (in second) of the red signal light at the time; the GET command is to get the time duration (in second) of the red signal light at the time In summary, the router monitoring data device A of roadway equipment of the present invention can monitor the return traffic data transmitted from the equipment side and determine whether the communication condition of the equipment side is abnormal or not through the judgment module 3 in conjunction with the whitelist database 5, as shown in FIG. 9. For example, the abnormal communication conditions being monitored include "line disconnection of equipment side", "line disconnection of routers", "abnormal IP address addition", "abnormal MAC address addition" or/and "abnormal communication port addition". If the condition is determined as an abnormal communication, the abnormal data will be further analyzed by the management platform center side 6 for subsequent processing. For one other example, when a suspected abnormal roadway equipment 9 undergoes a blackout/reboot process and still cannot be recovered, the management platform center side 6 can schedule a date for remote repair or dispatching an on-site repair. At the same time, on the date of conducting the on-site repair, the IP or MAC port that is expected to be applied shall be included in the whitelist of the router monitoring data device in advance through the update process, for the ease of repair work by the dispatched personnel. The designs and architecture structures of the present invention are not found in any published reports nor available to the public. Therefore, the present invention meets the requirements for patentability and, therefore, hereby the application is submitted.

The examples described above are a few preferred embodiments and the implementation of technical knowhow of the present invention. Alternative embodiments will become apparent to those skilled in the art to which the present invention described in the patent specification and the appended claims pertains without departing from its spirit and scope.

What is claimed is:

1. A router monitoring data device of roadway equipment, which comprises:
    a processor coupled to a memory, a communication module, a receiver module, a whitelist database, and a judgment module, wherein:
    the communication module transmits and receives data packets of roadway equipment out in the fields;
    the receiver module is electrically connected with the communication module and performs functions of receiving packets of push commands of a management platform center side;
    the whitelist database is electrically connected with the judgment module and has a function of storing a safety checklist of electronic device identification and network address;
    the judgment module is electrically connected with the receiver module and provides functions of analyzing packets of the return traffic data transmitted by the roadway equipment and judging command packets; and
    the judgment module issues commands that determine whether the return information sent from the roadway equipment shall be recorded and whether such information conforms an abnormal communication of a roadway equipment side;
    wherein the judgment module determines commands and conditions of abnormal communication of the roadway equipment side that must be recorded; comparison is performed based on the safety checklist of the electronic device identification and network address retrieved from the whitelist database; regardless whether a match is found or not, information of operational actions of the roadway equipment is transmitted by the communication module to a communication receiving program of a designated communication port specified by the management platform center side.

2. The router monitoring data device of roadway equipment as claimed in claim 1, wherein the communication module only captures and transmits fixed packet headers to a communication receiving program of the designated communication port specified by the management platform center side.

3. The router monitoring data device of roadway equipment as claimed in 1, wherein the safety checklist of the electronic device identification and network address is a list of communication ports of IP addresses and MAC addresses available for the roadway equipment to plug in.

4. The router monitoring data device of roadway equipment as claimed in claim 3, wherein the safety checklist of the electronic device identification and network address is updated on a daily basis.

5. The router monitoring data device of roadway equipment as claimed in claim 3, wherein the communication module can determine whether return traffic data of the roadway equipment can be uploaded to a traffic control center side based on the safety checklist of the electronic device identification and network address in order to ensure security and accuracy of the return traffic data.

6. The router monitoring data device of roadway equipment as claimed in 1, wherein an abnormal communication condition of the roadway equipment side refers to line disconnection of the roadway equipment side, line disconnection of routers, abnormal IP address addition, abnormal MAC address addition or/and abnormal communication port addition.

7. The router monitoring data device of roadway equipment as claimed in claim 1, wherein the roadway equipment includes vehicle detectors (VD), changeable message signs (CMS), traffic signal controllers (TC), automatic vehicle identification (AVI), or/and detectors of the electronic tag (eTag).

8. The router monitoring data device of roadway equipment as claimed in claim 1, wherein the roadway equipment includes vehicle detectors (VD), changeable message signs (CMS), traffic signal controllers (TC), automatic vehicle identification (AVI), or/and detectors of the electronic tag (eTag).

9. The router monitoring data device of roadway equipment as claimed in claim 2, wherein the roadway equipment includes vehicle detectors (VD), changeable message signs (CMS), traffic signal controllers (TC), automatic vehicle identification (AVI), or/and detectors of the electronic tag (eTag).

10. The router monitoring data device of roadway equipment as claimed in claim 3, wherein the roadway equipment includes vehicle detectors (VD), changeable message signs (CMS), traffic signal controllers (TC), automatic vehicle identification (AVI), or/and detectors of the electronic tag (eTag).

11. The router monitoring data device of roadway equipment as claimed in claim 4, wherein the roadway equipment includes vehicle detectors (VD), changeable message signs (CMS), traffic signal controllers (TC), automatic vehicle identification (AVI), or/and detectors of the electronic tag (eTag).

12. The router monitoring data device of roadway equipment as claimed in claim 5, wherein the roadway equipment includes vehicle detectors (VD), changeable message signs (CMS), traffic signal controllers (TC), automatic vehicle identification (AVI), or/and detectors of the electronic tag (eTag).

13. The router monitoring data device of roadway equipment as claimed in claim 6, wherein the roadway equipment includes vehicle detectors (VD), changeable message signs (CMS), traffic signal controllers (TC), automatic vehicle identification (AVI), or/and detectors of the electronic tag (eTag).

* * * * *